United States Patent [19]

Gingrich

[11] 4,120,746

[45] Oct. 17, 1978

[54] MULTIPLE STEAM CHEST SERIES FLOW EVAPORATOR

[75] Inventor: Reynard W. Gingrich, Fort Erie, Canada

[73] Assignee: Hooker Chemicals & Plastics Corp., Niagara Falls, N.Y.

[21] Appl. No.: 739,759

[22] Filed: Nov. 8, 1976

Related U.S. Application Data

[63] Continuation of Ser. No. 539,138, Jan. 7, 1975, abandoned.

[51] Int. Cl.² ............................................. B01D 1/12
[52] U.S. Cl. .............................. 159/47 R; 159/17 R; 159/24 R; 159/27 A; 159/27 B; 159/27 D; 159/45; 422/245
[58] Field of Search .................. 159/13, 27, 46, 17, 159/45, 24 R, 47; 23/273

[56] References Cited

U.S. PATENT DOCUMENTS

| | | | |
|---|---|---|---|
| 1,191,108 | 9/1976 | Kestner | 159/27 |
| 2,631,926 | 3/1963 | Eckstrom | 159/17 R |
| 2,732,008 | 1/1956 | Seeley | 159/27 |
| 2,764,233 | 9/1956 | Skinner | 159/13 |
| 3,074,473 | 1/1963 | Janovtchik | 159/27 |
| 3,459,509 | 8/1969 | Aoyama | 23/273 R |
| 3,675,707 | 7/1972 | Andersson | 159/20 R |

FOREIGN PATENT DOCUMENTS

| | | | |
|---|---|---|---|
| 209,838 | 6/1960 | Austria | 159/27 |
| 37-14,318 | 1962 | Japan | 159/27 |
| 13,005 | 1911 | United Kingdom | 159/45 |

*Primary Examiner*—Norman Yudkoff
*Attorney, Agent, or Firm*—Peter F. Casella; Howard M. Ellis

[57] ABSTRACT

A method for evaporating a liquor comprised of a solvent and solute in a multiple external heat exchanger type evaporator having a vapor body means with an inlet means and an outlet means comprising the steps:

1. Passing the liquor out of the vapor body outlet means into a first heat exchanger means, having an inlet means and an outlet means;
2. Passing the liquor from the outlet means of the first heat exchanger means to an inlet means of a second heat exchanger means, said second heat exchanger means also having an outlet means;
3. Passing the liquor from the outlet means of the second heat exchanger means into the vapor body means;
4. Heating the liquor at a temperature greater than its boiling point as it passes through the multiple heat exchanger means; and
5. Vaporizing a portion of the solvent segment of the liquor in the vapor body after the liquor leaves the multiple heat exchanger means.

13 Claims, 4 Drawing Figures

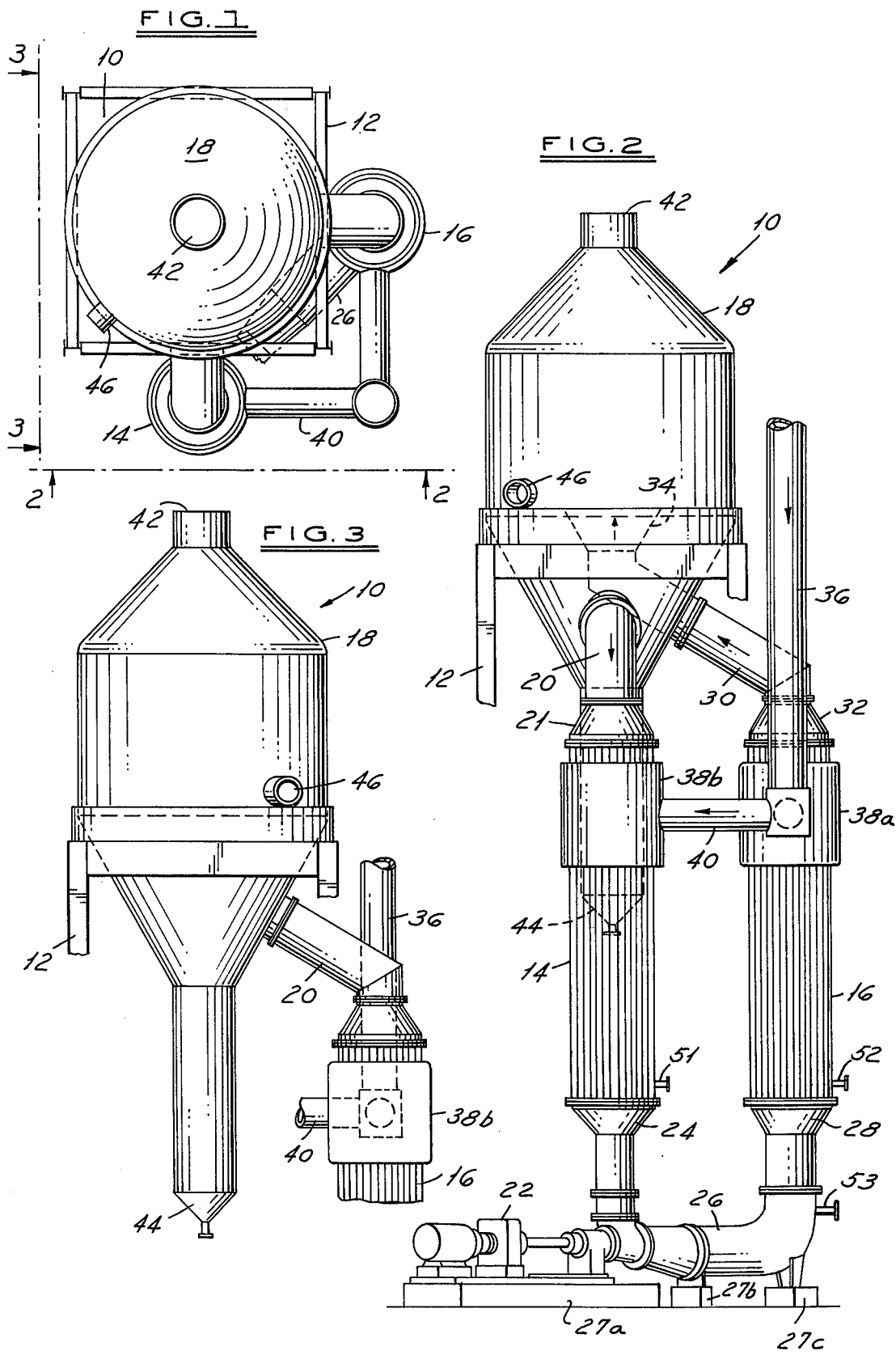

MULTIPLE STEAM CHEST SERIES FLOW EVAPORATOR

This is a continuation of application Ser. No. 539,138, filed Jan. 7, 1975, now abandoned.

BACKGROUND OF THE INVENTION

Various means for evaporating liquors through use of heat exchangers have been suggested in the art such as that shown in U.S. Pat. No. 965,388; U.S. Pat. No. 2,741,303; and British Pat. No. 953,627. Multiple external steam chest heat exchangers are described in East German Pat. No. 209,838, British Pat. No. 700,852, French Pat. No. 562,476 and U.S. Pat. No. 2,695,869. Multiple external steam chests employing a parallel flow through them are described in Japanese Pat. No. 14318 of 1962.

SUMMARY OF THE INVENTION

The invention is concerned with evaporators of the multiple chest type. In particular, the invention is concerned with the employment of multiple external chests in conjunction with the vapor body of the evaporator or a portion of the evaporator whereby flow is effected by means of forced circulation. By "chest," is meant a heat exchanger system whereby mother liquor is passed through it and the liquor is heated or boiled therein by means of a heating medium such as steam. Most preferably the mother liquor flows through tubes in a heat exchange apparatus with an indirect contact being made with steam or other heating liquid to cause a heating or boiling of the mother liquor. When steam is used as the heating medium, the chest or heat exchanger is frequently referred to as a "steam chest."

As evaporators, such as those for evaporating caustic, increase in size, and as the cost of energy becomes more expensive, more restraints must be made on design engineering in order to effect the most efficient energy utilization, as well as to control costs. In particular, the present invention is concerned with a method for evaporating a liquor comprised of a solvent and a solute in a multiple external heat exchanger type evaporator having a vapor body means with an inlet means and an outlet means comprising the steps:

1. Passing the liquor out of the vapor body outlet means into a first heat exchanger means, having an inlet means and an outlet means;
2. Passing the liquor from the outlet means of the first heat exchanger means to an inlet means of a second heat exchanger means, said second heat exchanger means also having an outlet means;
3. Passing the liquor from the outlet means of the second heat exchanger means into the vapor body means;
4. Heating the liquor at a temperature greater than its boiling point as it passes through the multiple heat exchanger means; and
5. Vaporizing a portion of the solvent segment of the liquor in the vapor body after the liquor leaves the multiple heat exchanger means.

BRIEF DESCRIPTION OF DRAWINGS

FIG. 1 is a top view of the multiple external steam chest evaporator of the present invention.

FIG. 2 is a front view of the evaporator of FIG. 1 taken along the lines 2 — 2 of FIG. 1;

FIG. 3 is partial view of the evaporator of FIG. 1 taken along the lines 3 — 3 of FIG. 1 showing in particular the elutriating leg 44 and FIG. 4 shows a front view of multiple effect evaporators connected in series.

DESCRIPTION OF PREFERRED EMBODIMENTS

Figure 4:
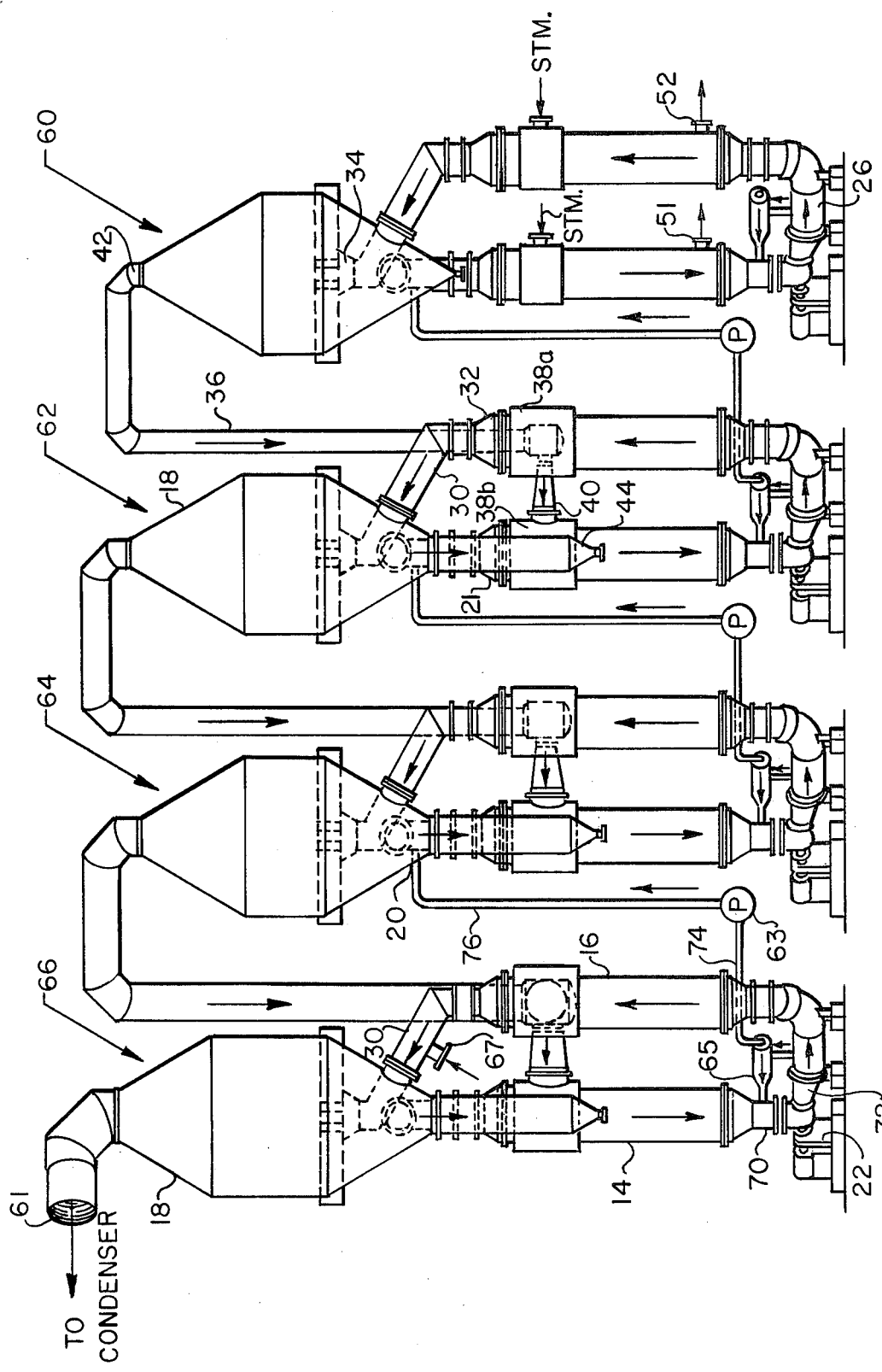

The present invention is concerned with an evaporator employing a vapor body and having multiple external heat exchanger means. More particularly, the mother liquor which is being evaporated in the vapor body will flow from the vapor body through one of the external heat exchanger means into the other heat exchanger means and back into the vapor body. Steam is introduced into the external heat exchanger means to cause the mother liquor to be indirectly heated by convection such that the pressure of the mother liquor is incrementally increased. The distinct advantage of employing the method of the present invention is that by means of one pump, and with an appropriate arrangement of the flow of the mother liquor, significant cost savings can be obtained over other multiple external heat exchanger evaporators.

In the operation of the invention one external heat exchanger means is used on the pump suction side and the other of the multiple heat exchanger apparatus is on the pump discharge, which makes for convenient flow from the vapor body into the first heat exchanger means, then into the second heat exchanger means and back into the vapor body, preferably through a distributor which is located in the interior of the vapor body. Having now described the invention in general, it may be more accurately described by a review of the drawings.

FIG. No. 1 shows the evaporator 10 to be employed in the method of the present invention. In particular, the evaporator employed in the method of the present invention contains a vapor body 18 to which are connected multiple external steam chests 14 and 16. Mother liquor which is present in the vapor body flows from the vapor body supported by various structure means 12 into conduit 20 and then into the upper portion 21 of the first exchanger means and is pumped by pumping means 22 from the bottom 24 of the first heat exchanger means through conduit 26 into the second heat exchanger means 16 having a bottom or inlet portion 28. The pumping means 22 and the conduit 26 are resting on ground supports 27a, 27b and 27c. The liquor then flows back into the vapor body 18 via conduit 30 which is connected to the vapor body from the outlet 32 of the second heat exchange means. The mother liquor is passed into the vapor body by means of distributor 34 located in the interior of the vapor body. For illustrative purposes, the pumping means may circulate the liquor at the rate of 60,000 gallons per minute.

In order to effect appropriate heating or boiling of the mother liquor, steam or other heated liquid is introduced into inlet 36 and is placed into the multiple steam chests by means of distributing means 38a and 38b connected by means of conduit 40. While not shown in the drawings, the steam condenses in the multiple steam chests and the condensate formed is discharged through Exit 51 and 52 for other uses in the evaporator system or elsewhere.

During the evaporating process the vapor formed by flashing off the heat picked up in the heat exchanger means passes out the top 42 of the vapor body and may be employed in subsequent heating steps, or, may be passed to another effect in a multiple effect evaporating system. Product is collected from elutriating leg 44.

Feed of mother liquor can be passed into the evaporating system as shown in the figures by a number of means. One technique is shown in FIG. 2 wherein an inlet 46 to the vapor body is shown. Alternatively, feed may be introduced into the inlet or outlet means of either one of the multiple steam chests, or, the connecting conduit 26.

It is to be appreciated that various heating medium may be employed besides steam for causing a heating or boiling of the mother liquid. Suitable other liquids could be employed provided they may be heated to a temperature significantly above the boiling point of the mother liquor.

The most preferred embodiment for the mother liquor of the present invention is aqueous salt-caustic liquor from an electrolytic cell. However, other aqueous or organic solutions containing dissolved inorganic or organic salts may be concentrated in like manner to obtain a crystalline product. Also, non-crystallizing type products such as pulp mill liquors and various food product liquors may also be evaporated according to the method of the present invention.

Multiple evaporators may be placed in series as illustrated in FIG. 4. By this is meant that an evaporating system may be designed having three or more effects wherein the mother liquor is initially introduced into one effect and is passed on to the other subsequent effects. FIG. 4 shows one embodiment of a quadruple effect evaporation system, wherein 60 is the first effect, 62 the second effect, 64 the third effect and 66 the fourth effect evaporators. Salt-caustic liquor from an electrolytic cell may be introduced at inlet 46 of circulation conduit 30 of fourth effect evaporator 66. Liquor discharged from vapor body 18 is conducted through stream chest 14 to intake zone 70 of pump 22. Heated liquor containing salt-solids enters cyclone 65 from discharge zone 72 recirculating the salt-solids to intake zone 70. For further concentration clear cell liquor, free of salt-solids is circulated from cyclone 65 to the third, second and first effect evaporators by conduits 74 and 76 assisted by pump means 63. To heat the liquor further hot vapor flashed off at top 42 of vapor body 18 is circulated by conduits 36 to stream chests 14 and 16 of the second, third and fourth effect evaporators and discharged at 61 for condensing. In addition, the desired product would be collected from the elutriating leg 44. Product could also be obtained from discharge nozzle 53 if desired.

In operating the multiple steam chest evaporator, the method of the present invention, one may, for example, concentrate caustic in three effects. In the third effect 11% by weight caustic soda (aqueous NaOH) feed may be concentrated to 17%. The caustic may then be passed to the second effect wherein the concentration increases to about 26 to 28% and consequently on to the first effect where it may be increased to about 45%. Also, it should be recognized that pressure and temperature conditions will vary within each of the effects in accordance with the equilibrium established.

While the drawings have demonstrated two external heat exchangers or two multiple steam chests, each pair having but one pump for series circulation, it is to be appreciated that four or more steam chests could be employed with one pumping mechanism per pair of steam chests. In each of these alternative embodiments, the first steam chest would be the suction side of the pump while the second steam chest would be the discharge side of the pump.

It should also be appreciated that other embodiments or modifications may be made to the apparatus such as within the skill of those versed in the art. An example might be the use of a mesh type separator present in the upper portion of the vapor body 18. This would prevent any water, solution or particulate product from passing out of the exit 42 of the vapor body but would permit steam to pass through there.

In addition, it should be pointed out that the elutriating leg 44 need not be present in one embodiment of the invention. In which case product could be collected from discharge point 53. In multiple effect, evaporating systems one effect may not have elutriating leg 44 while other effects may have said leg. The elutriating leg is preferably used when one wishes to concentrate the liquor and obtain a crystalline product.

I claim:

1. A method for evaporating a liquor comprising a solvent and a solute in a forced circulation evaporator, said evaporator comprising in combination an evaporation chamber equipped with liquor inlet and outlet and vapor discharge outlet, at least first and second heat exchangers each with liquor inlet and outlet interconnected in series for heating liquor, said heat exchangers positioned external to the evaporation chamber and interconnected with the liquor inlet and outlet of the evaporation chamber, pump means for forcibly circulating heated liquor from the first exchanger to the second exchanger and to the evaporation chamber, said pump means being positioned between the liquor outlet of the first exchanger and the liquor inlet of the second exchanger, said evaporator including means for feeding liquor into the evaporator and product removal, said method comprising the steps of:

(a) feeding the liquor into the evaporator,
(b) heating the liquor to a temperature greater than its boiling point by forcibly circulating the liquor through the first and second heat exchangers,
(c) forcibly circulating the heated liquor from the heat exchangers to the evaporation chamber to vaporize and discharge a portion of the solvent, and
(d) removing concentrated product from the evaporator.

2. The method of claim 1 wherein the evaporator includes distributor means for returning heated liquor to the evaporation chamber.

3. The method of claim 1 wherein the evaporator is comprised of a multiplicity of evaporation effects.

4. The method of claim 3 wherein the evaporator has three or more evaporation effects connected in series.

5. The method of claim 4 wherein the forced circulation evaporator is a multiple effect evaporator comprised of first, second and third effects.

6. The method of claim 3 wherein the evaporator is comprised of a combination of first, second, third and fourth evaporation effects.

7. The method of claim 1 wherein the liquor feed is an aqueous salt-caustic liquor from an electrolytic cell.

8. The method of claim 1 wherein the liquor feed is a pulp mill liquor.

9. A forced circulation evaporator for evaporating a liquor having a solvent and a solute, said evaporator comprising in combination an evaporation chamber equipped with liquor inlet and outlet and vapor discharge outlet, at least first and second heat exchangers each with liquor inlet and outlet interconnected in series for heating liquor, said heat exchangers positioned external to the evaporation chamber and interconnected with the liquor inlet and outlet of the evaporation chamber, pump means for forcibly circulating heated liquor from the first exchanger to the second exchanger and to the evaporation chamber, said pump means being positioned between the liquor outlet of the first exchanger and the liquor inlet of the second exchanger, said evaporator including means for feeding liquor into the evaporator and product removal.

10. The forced circulation evaporator of claim 9 comprising a multiplicity of evaporation effects.

11. The forced circulation evaporator of claim 10 comprising in combination first, second, third and fourth evaporation effects.

12. The forced circulation evaporator of claim 10 wherein said evaporator is comprised of first, second and third effects.

13. The forced circulation evaporator of claim 9 wherein the evaporation chamber includes means for distributing heated liquor returning to the evaporator from the second heat exchanger.

* * * * *